(12) United States Patent
Karaoguz (10) Patent No.: US 8,995,288 B2
(45) Date of Patent: Mar. 31, 2015

(54) METHOD AND SYSTEM FOR A CONFIGURABLE COMMUNICATION INTEGRATED CIRCUIT AND/OR CHIPSET

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 517 days.

(21) Appl. No.: 12/136,595

(22) Filed: Jun. 10, 2008

(65) Prior Publication Data

US 2008/0304425 A1     Dec. 11, 2008

Related U.S. Application Data

(60) Provisional application No. 60/943,178, filed on Jun. 11, 2007.

(51) Int. Cl.
*H04L 12/26* (2006.01)
*H04B 1/40* (2006.01)
*H04B 1/00* (2006.01)

(52) U.S. Cl.
CPC .............. *H04B 1/40* (2013.01); *H04B 1/0003* (2013.01)
USPC ....... 370/252; 455/67.11; 455/92; 455/115.1; 703/13; 703/17; 703/20; 703/21; 703/22; 703/23

(58) Field of Classification Search
None
See application file for complete search history.

(56) References Cited

U.S. PATENT DOCUMENTS

| 5,697,055 | A | * | 12/1997 | Gilhousen et al. | ............ 455/436 |
| 5,909,645 | A | * | 6/1999 | Abramsky et al. | ......... 455/249.1 |
| 5,913,172 | A | * | 6/1999 | McCabe et al. | ................ 455/503 |
| 6,215,792 | B1 | * | 4/2001 | Abi-Nassif | .................... 370/458 |
| 6,850,973 | B1 | * | 2/2005 | Larson et al. | ................. 709/221 |
| 6,983,125 | B2 | * | 1/2006 | Smee et al. | .................. 455/63.1 |
| 7,007,220 | B2 | * | 2/2006 | Zhang et al. | ................... 714/752 |

(Continued)

FOREIGN PATENT DOCUMENTS

| WO | WO 2006/011866 | | 2/2006 | |
| WO | WO 2006065008 A1 | * | 6/2006 | ............... H04L 1/18 |

OTHER PUBLICATIONS

International Preliminary Report on Patentability for International Patent Application No. PCT/US2008/066579, mailed Dec. 23, 2009.

(Continued)

*Primary Examiner* — Kibrom T Hailu
*Assistant Examiner* — James P Duffy
(74) *Attorney, Agent, or Firm* — Brinks Gilson & Lione (57) ABSTRACT

A deployed configurable communication integrated circuit (IC) and/or chipset which may be integrated within a wireless communication and/or multi-media communication device may be operable to monitor its operating conditions, performance and/or utilization characteristics. It may send information via a wireless, optical and/or wired network to a remote analysis and/or development system and/or service, such as an engineering service, that may determine and return configuration parameters. The configuration parameters may be utilized to adjust antenna and/or MIMO, SIMO, MISO and beamforming configuration, power level, interference rejection, equalizer length, dynamic range, modulation, encoding and/or decoding, analog to digital conversion precision, error detection and/or correction parameters, MAC parameters such as timing thresholds, transmit window size and/or buffer space. The configurable communication IC and/or chipset may configure and/or reconfigure itself one or more times over a period of time while deployed in the field.

15 Claims, 4 Drawing Sheets

(56) References Cited

U.S. PATENT DOCUMENTS

| | | | |
|---|---|---|---|
| 7,133,822 B1* | 11/2006 | Jacobson | 703/28 |
| 7,151,759 B1* | 12/2006 | Ryan et al. | 370/332 |
| 2002/0002609 A1* | 1/2002 | Chung et al. | 709/223 |
| 2002/0029263 A1* | 3/2002 | Toyoshima et al. | 709/223 |
| 2002/0047775 A1* | 4/2002 | del Castillo et al. | 340/3.54 |
| 2002/0049063 A1* | 4/2002 | Nohara et al. | 455/456 |
| 2002/0123319 A1* | 9/2002 | Peterzell | 455/296 |
| 2002/0154620 A1* | 10/2002 | Azenkot et al. | 370/347 |
| 2004/0028003 A1* | 2/2004 | Diener et al. | 370/319 |
| 2004/0143428 A1* | 7/2004 | Rappaport et al. | 703/22 |
| 2005/0027789 A1* | 2/2005 | Luo et al. | 709/200 |
| 2006/0009209 A1* | 1/2006 | Rieser et al. | 455/423 |
| 2006/0063539 A1* | 3/2006 | Beyer, Jr. | 455/456.3 |
| 2006/0146948 A1* | 7/2006 | Park et al. | 375/260 |
| 2007/0217436 A1* | 9/2007 | Markley et al. | 370/401 |

OTHER PUBLICATIONS

Seagate Technology LLC, Seagate D.A.V.E. (Digital Audio Video Experience) Transform the consumer digital content experience with the Seagate D.A.V.E. design concept, Data Sheet, 2007.

Seagate Technology LLC, Seagate D.A.V.E. (Digital Audio Video Experience) The portable storage platform that collects, plays and manages digital content, Product Overview, 2007.

International Search Report corresponding to International Application Serial No. PCT/US2008/066579, mailed Sep. 25, 2008, 3 pages.

Written Opinion of the International Searching Authority corresponding to International Application Serial No. PCT/US2008/066579, mailed Sep. 25, 2008, 8 pages.

* cited by examiner

METHOD AND SYSTEM FOR A CONFIGURABLE COMMUNICATION INTEGRATED CIRCUIT AND/OR CHIPSET

CROSS-REFERENCE TO RELATED APPLICATIONS/INCORPORATION BY REFERENCE

This application makes reference to, claims priority to, and claims the benefit of U.S. Provisional Application Ser. No. 60/943,178, filed on Jun. 11, 2007, entitled "LIFETIME UPDATEABLE INTEGRATED CIRCUIT," which is incorporated herein by reference in its entirety.

FIELD OF THE INVENTION

Certain embodiments of the invention relate to communication. More specifically, certain embodiments of the invention relate to a method and system for a configurable communication integrated circuit and/or chipset.

BACKGROUND OF THE INVENTION

The field of wireless communication has seen dramatic growth the last few years. In today's world, most people use their portable devices, be it cellular phones, PDA's, laptops, media players and/or other devices, for various purposes, business and personal, on a constant and daily basis. Increasingly, people are able to access information according to their individual choice. For instance people may select music or videos from an electronic media store of their choice and play them on portable devices. In addition, the Internet allows people to access news and information at a time convenient for them rather than at specified broadcast times. In addition, many wireless solutions have been introduced, and have made tremendous strides into everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 3 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLANs provide connectivity to devices that are located within a slightly larger geographical area, such as the area covered by a building or a campus, for example. WLAN systems are generally based on specific standards, for example IEEE 803.11 standard specifications, and typically operate within a 100-meter range, and are generally utilized to supplement the communication capacity provided by traditional wired Local Area Networks (LANs) installed in the same geographic area as the WLAN system.

Other wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS, UMTS, and CDMA3000 may incorporate substantial data capabilities. Most of today's cellular services may include such features as text messaging, video streaming and/or web browsing.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a configurable communication integrated circuit and/or chipset, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the invention may be found in a method and system for a configurable communication integrated circuit and/or chipset. In this regard, a deployed configurable communication integrated circuit (IC) and/or chipset that may be serviced by an external servicing entity may be integrated within a wireless communication and/or multi-media communication device. The deployed configurable communication integrated circuit (IC) and/or chipset may be operable to monitor its operating conditions, performance and/or utilization characteristics. In addition, the deployed configurable communication IC and/or chip set may send information derived from the monitoring of operating conditions, performance and/or utilization characteristics to one or more external entities and/or services. For example, the external entity may comprise a remote analysis and/or development system and/or engineering services that may be enabled to utilize the sent information to determine configuration parameters for the deployed configurable communication IC and/or chipset. In this regard, the external entity may function separately from a system and/or network that may be engaged in communication operations with the deployed configurable communication IC and/or chipset. For example, the external entity may not be involved in initiating and/or maintaining communication with the deployed configurable communication IC and/or chipset and/or the wireless communication and/or multi-media communication device. Furthermore, the external entity may send the determined configuration parameters to the configurable communication IC and/or chipset. Upon receiving the configuration parameters, the deployed configurable communication IC and/or chip set may be configured or may configure itself according to the received configuration parameters. The sending and/or receiving of information by the deployed configurable communication IC and/or chipset as well as the determining of configuration parameters may occur as background functions and/or operations with respect to other functionality and/or operations of the deployed configurable communication IC and/or chipset. Moreover, the information may be transmitted and/or received by the deployed configurable communication IC and/or chipset via a wireless, optical and/or wired network, for example. In this manner, the deployed configurable communication integrated circuit and/or chipset may be configured and/or reconfigured one or more times.

In various embodiments of the invention, the process of a configuring and/or reconfiguring may be performed by a configurable communication IC and/or chipset vendor or an engineering service for an extended period of time, for example, the lifetime of the IC and/or chipset. The operating conditions that may be monitored by the configurable communication IC and/or chipset may comprise one or more of channel characteristics, interference characteristics and/or noise levels, signal to noise ratio and multi-path delay, received signal strength and long or short term operating statistics for example. Accordingly, the performance that may be monitored may comprise, for example, one or more of bit error rate (BER), packet error rate (PER), spectral efficiency and long or short term performance statistics. Moreover, the utilization characteristics that may be monitored may comprise one or more of current configuration parameters, transmit power levels, dynamic range, type and/or rate of data transmissions, quality of service (QoS) utilized and long or short term utilization statistics may be monitored. In this regard, the configuration parameters that may be determined based on the monitoring may adjust one or more of antenna and/or MIMO, SIMO, MISO and beamforming configuration, power level, interference rejection, equalizer length, dynamic range, modulation, encoding and/or decoding, analog to digital conversion precision, error detection and/or correction parameters within said configurable communication IC and/or chipset. Furthermore, MAC parameters such as timing thresholds, transmit window size and/or buffer space may be adjusted with the received and/or determined one or more configuration parameters.

Figure 1:
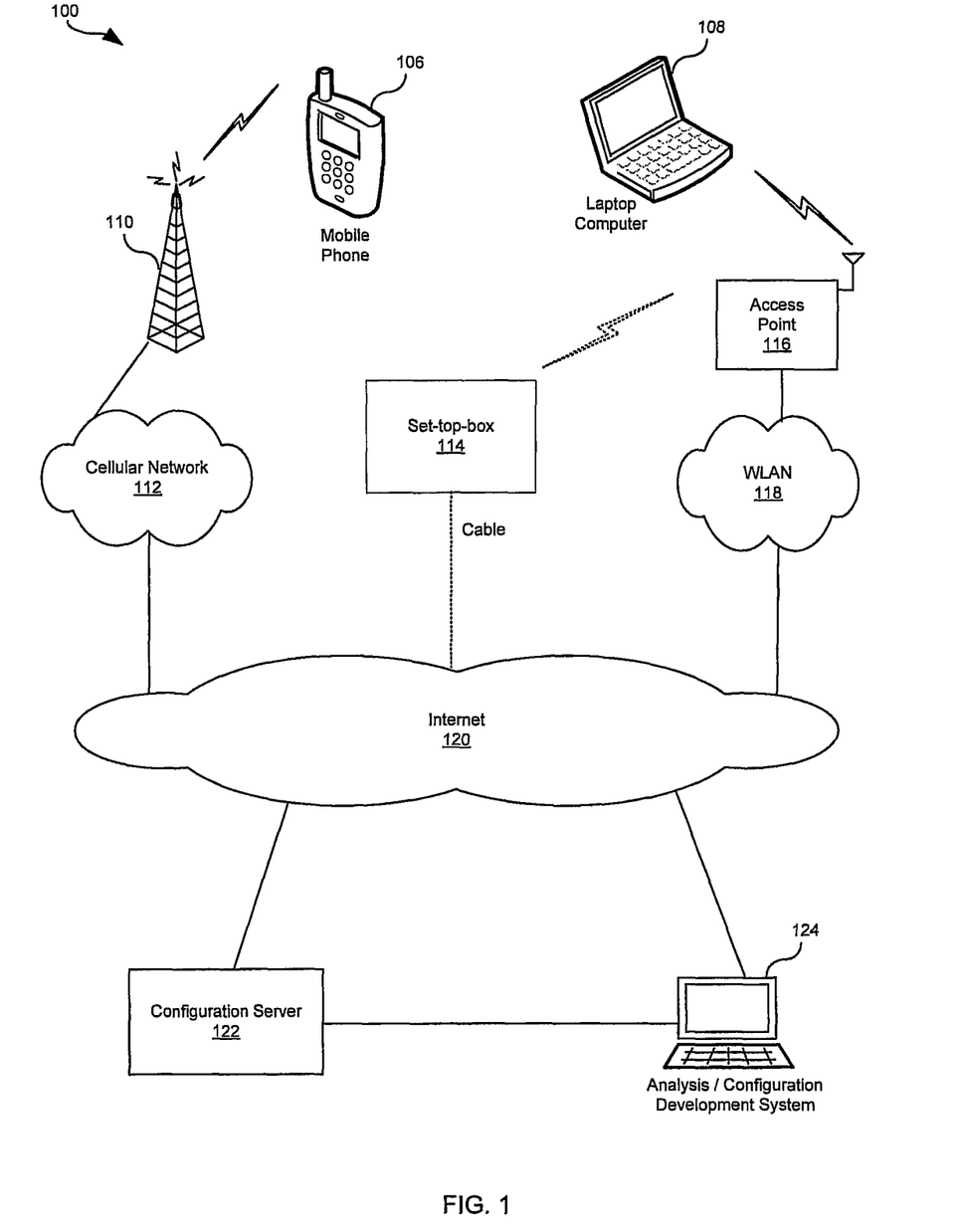
FIG. 1 is a block diagram of an exemplary system enabled for deployment of self monitoring, and configurable communication integrated circuits and/or chipsets, in accordance with an embodiment of the invention.

FIG. 1 is a block diagram of an exemplary system enabled for deployment of self monitoring, and configurable communication integrated circuits and/or chipsets, in accordance with an embodiment of the invention. Referring to FIG. 1 there is shown an exemplary communication system 100 comprising a plurality of deployed, mobile and/or stationary, communication devices such as a mobile phone 106, a laptop 108, a set-top-box 114 and/or an access point 116. A plurality of communication networks are shown comprising a cellular base station 110, a cellular network 112, a WLAN 118 and Internet 120. In addition, a configuration server 122 and an analysis and/or configuration analysis and/or development system 124 is shown.

The mobile phone 106, laptop 108, set-top-box 114 and/or access point 116 may be exemplary communication enabled devices that may be deployed and/or operational. In this regard, the exemplary communication devices may comprise suitable logic, circuitry and/or code that may enable one or more characteristics of a mobile phone, a computing device, a media player, a personal digital assistant and/or a network device. In addition, the mobile phone 106, laptop 108, set-top-box 114 and/or access point 116 may comprise one or more configurable communication integrated circuits and/or chipsets that may be operable to self monitor operating conditions and/or communication characteristics and to communicate information derived from the monitoring to the configuration server 122 and/or analysis/development system 124. Moreover, the one or more configurable communication integrated circuits and/or chipsets may receive communication from the configuration server 122 and may self configure operational parameters based on the received communication. In some embodiments of the invention, the communication to and/or from the phone 106, laptop 108, set-top-box 114 and/or access point 116 for the purpose of updating operational parameters may run in the background of other communication activity.

The mobile phone 106 may be communicatively coupled with configuration server 122 and/or analysis and/or configuration development system 124 via the base station 110, cellular network 112 and/or the Internet 120, for example. In this regard, the laptop 108, the configurable communication IC and/or chipset within the mobile phone 106 may comprise suitable logic, circuitry and/or code that may communicate utilizing one more wireless technologies, for example, GSM, CDMA, WCDMA, UMTS and/or LTE. Notwithstanding, the present invention is not limited to communicating via any specific wireless technology and/or protocol and may utilize any suitable wireless, wire-line and/or tethered communication technology and/or protocol.

The set-top-box 114 may comprise suitable logic circuitry and/or code that is operable to receive and sometimes decode a signal received from an external entity, for example, via a cable, satellite, Ethernet, DSL or antenna, and to convert the signal to content that may be displayed on a television. The set-top-box 114 may be communicatively coupled with the configuration server 122 and/or analysis/configuration development system 124 via a cable technology and the Internet 120. The set-top-box may be communicatively coupled wirelessly, via the access point 116, WLAN 118 and internet 120 for example.

The laptop 108 may comprise suitable logic circuitry and/or code that is operable to perform general computing tasks of a personal computer and/or communicate via one or more wireless, optical and/or wired technologies. The laptop 108 may be communicatively coupled with the configuration server 122 and/or analysis/configuration development system 124 via the access point 116, WLAN 118 and internet 120 for example. Furthermore, the access point 116 may comprise the configurable communication ICs and/or chipsets and may be communicatively coupled with the configuration server 122 and/or analysis/configuration development system 124 via the WLAN 118 and the internet 120 for example.

In operation, the configurable communication ICs and/or chips within the mobile phone 106, laptop 108, set-top-box 114 and/or access point 116 may comprise suitable logic, circuitry and/or code that may be operable to monitor operating conditions. For example, operating conditions that may affect transmission and/or reception performance such as various channel characteristics, interference, SNR and/or multi-path delay may be monitored by the configurable communication ICs and/or chipsets. Accordingly, measurements of performance, for example, bit error rate (BER) or packet error rate (PER) may be monitored by the configurable communication ICs and/or chipset. In addition, various utilization characteristics may be monitored, for example, current configuration parameters, transmit power levels, dynamic range, type and/or rate of data transmissions and/or quality of service (QoS) utilized may be monitored by the configurable communication ICs and/or chipset. Accordingly, information derived from the monitored conditions and/or characteristics may be communicated from the configurable communication ICs and/or chipsets to the configuration server 122 and/or analysis/configuration development system 124. In this manner, new and or updated configuration parameters for the configurable communication ICs and/or chipsets may be determined for each particular operating environment. The new and/or updated configuration parameters may then be communicated to their respective deployed configurable communication ICs and/or chipsets within the mobile phone 106, laptop 108, set-top-box 114 and/or access point 116 and configuration parameters may be updated in "the field" accordingly.

Figure 2:
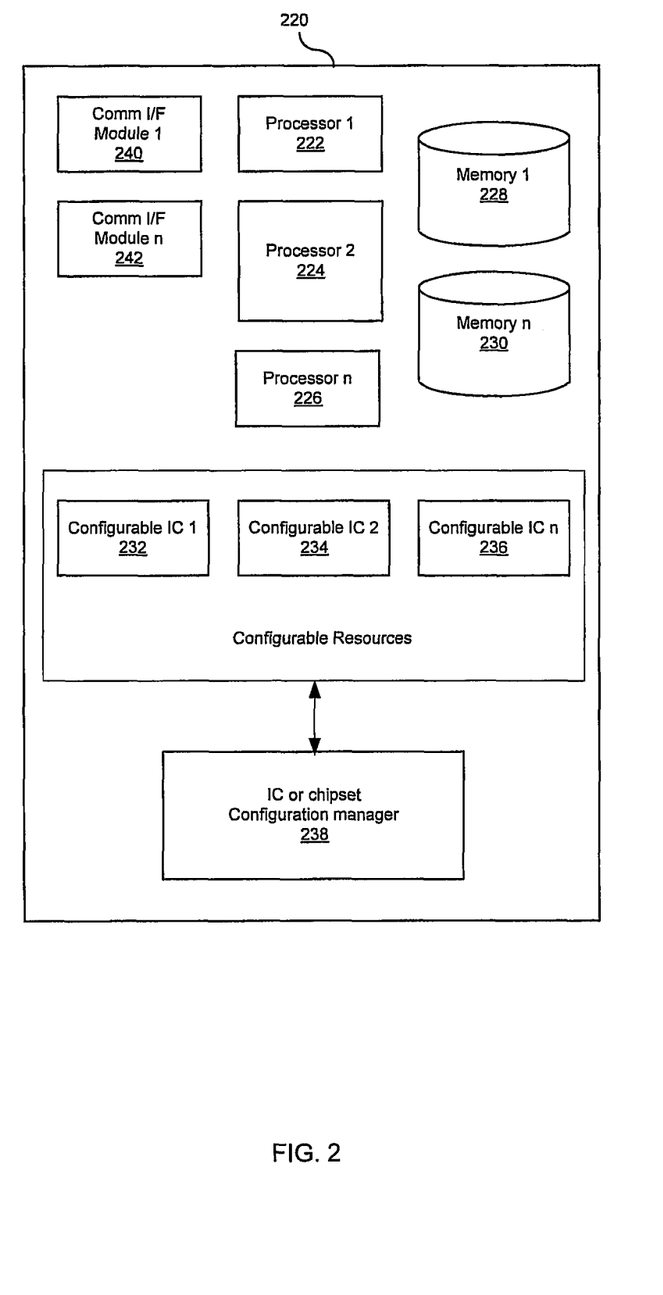
FIG. 2 is a block diagram of an exemplary device comprising one or more deployed configurable communication integrated circuits and/or chipsets, in accordance with an embodiment of the invention.

FIG. 2 is a block diagram of an exemplary device comprising one or more deployed configurable communication integrated circuits and/or chipsets, in accordance with an embodiment of the invention. Referring to FIG. 2 there is shown a communication device 220 which may comprise one or more processors 222, 224 and 226, memory units 228 and 230, communication interface modules 240 and 242, configurable communication ICs and/or chipsets 232, 234 and 236 and an IC and/or chipset configuration manager 238.

The communication device 220 may comprise suitable logic, circuitry and/or code that is operable to communicate via one or more wireless, optical and/or wired technologies. For example, the communication device 220 may be a mobile phone that may communicate utilizing CDMA, GSM, WLAN, WiMax, ZigBee and/or Bluetooth. The communication device 220 may be any suitable device that may comprise one or more configurable communication ICs and/or chipsets 232, 234 and/or 236. Exemplary communication devices 220 may be similar to and/or substantially the same as the mobile phone 106, laptop 108, set-top-box 114 or access point 116 described with respect to FIG. 1.

The one or more processors 222, 224 and/or 226 may comprise, for example, a central processor, co-processor and/or digital signal processor (DSP) respectively. The processor 222 may comprise suitable logic, circuitry and/or code that enable control and/or management operations, in the communication device 220. In this regard, the processors 222 may communicate control and/or management operations to the configurable communication ICs and/or chipsets 232, 234 and/or 236 as well as communication interfaces 240 and/or 242. The processors 224 and/or 226 may process data received or sent via the communication interfaces 240 and/or 242 as well as the configurable communication ICs and/or chipsets 232, 234, and/or 236.

The one or more communication interface modules, for example, 240 and/or 242 may comprise suitable logic, circuitry and/or code that enable digital and/or analog peripheral transport. For example, the communication interface modules 240 and/or 242 may support universal serial bus (USB) and/or inter-IC sound (I$^2$S) for example.

The memory 228 and/or 230 may comprise suitable logic, circuitry, and/or code that enable storage and retrieval of data and/or instructions that may be utilized by the processors 222, 224 and/or 226. In this regard, the memory 228 and/or 230 may store at least a portion of data that may be transmitted and/or received by at least one of the communication interface modules 240 and/or 242. Moreover, the memory 228 and/or 230 may store at least a portion of the data that may be transmitted and/or received by at least one of the configurable communication ICs and/or chipsets 232, 234 and 236.

The configurable communication ICs and/or chipset 232, 234 and/or 237 may comprise suitable logic, circuitry, and/or code to be utilized within a plurality of communication and/or processing platforms. The communication and/or processing platforms may comprise, for example, wireless transceivers, baseband processors, encoders, decoders, digital and/or analog filters, memory devices, user interface devices and/or a variety of high performance processors. In this regard, the configurable communication ICs and/or chipsets 232, 234 and 237, may enable voice communication as well as sharing and/or processing of data. For example, multimedia distribution such as voice, audio, video and/or still images, messaging, video telephony, interactive gaming, location-based services and Web browsing may be supported. In some embodiments of the invention, the ICs and/or chipsets 232, 234, and/or 237 may provide graphics, audio, and/or text processing for example. In addition, the configurable communication ICs and/or chipset 232, 234 and/or 237 may support geo-location and/or navigation operations for various devices.

The configurable communication ICs and/or chipset 232, 234 and/or 237 may communicate via one or more of a plurality of wireless, optical and/or wired technologies, for example, personal area networks (PAN) such as ZigBee and Bluetooth®, wireless local area networks (WLAN) such as Wi-Fi®, local area networks (LAN), metropolitan area networks (MAN), VoIP, FM radio, WiMax, DVB-H, 2G, 3G and/or 4G cellular, infrared, multimedia and other wired, wireless and/or optical communication technologies. Moreover, the configurable communication ICs and/or chipsets 232, 234 and 236 may comprise suitable logic, circuitry and/or code that may be operable to monitor a variety of operating conditions. For example, operating conditions that may affect transmission and/or reception performance such as various channel characteristics, interference, SNR, bit error rate (BER), packet error rate (PER), and/or multi-path delay may be monitored. Performance may be monitored as well, for example, bit error rate (BER) or packet error rate (PER) and/or spectral efficiency may be monitored.

In addition, various operating characteristics, for example, current and/or voltage configuration parameters, transmit power levels, dynamic range, type and/or rate of data transmissions and/or quality of service (QoS) utilized may be monitored by the configurable communication ICs and/or chipsets 232, 234 and 236. Accordingly, information derived from the monitored conditions and/or characteristics may be communicated from the configurable communication ICs and/or chipset 232, 234 and/or 236 via one or more of the wireless, optical and/or wired technologies, to, for example, the configuration server 122 described with respect to FIG. 1. In addition, configurable communication ICs and/or chipset 232, 234 and 236 may receive new and/or updated configuration parameters that may be determined based on the communicated operating conditions and/or characteristics via one or more wireless, optical and/or wired technologies. The configurable communication ICs and/or chipset 232, 234 and 236 may be updated "in the field" with the new and/or updated configuration parameters.

The IC and/or chipset configuration manager 238 may comprise suitable logic, circuitry and/or code that manage monitoring, communications and/or configuration updates for the configurable communication ICs and/or chipset 232, 234 and 236. In this regard, the IC and/or chipset configuration manager 238 may coordinate configuration update enabling activity with execution of other functions and features performed within the configurable communication ICs and/or chipset 232, 234 and 236 and/or the communication device 220. In various instances the configuration update enabling activity may operate in the background of other functions and features performed within the device 220. In other instances, the other functions and features performed by the device 220 may be disengaged or disable while configuration modification enabling activities are implemented.

In operation, the communication device 220 and/or other types of devices may comprise the configurable communication ICs and/or chipset 232, 234 and 236 and may utilize them in different ways. Moreover, the communication device 220 may be mass produced and distributed such that different units may function under different operating conditions that may impact performance levels accordingly. In addition, a single unit may be portable and may operate in varying locations that present varying operating conditions such as interference, received signal strength or multi-path, for example. In this regard, each instance of the configurable communication ICs and/or chipset 232, 234 and 236 may improve communication and/or processing performance by updating configuration parameters based on measurements and/or monitoring of local operating conditions and/or utilization characteristics. The IC or chipset configuration manager 238 may coordinate multi-media processing and/or communication functions performed by the communication device 220 with functions for improving performance and/or modifying configuration parameters within the ICs and/or chipset 232, 234 and 236.

The configuration manager 238 may comprise suitable logic, circuitry and/or code that enables communication of the measured and/or monitored data to, for example, a configuration server 122. The configuration server 122 may forward data to the analysis and/or configuration development system 124. New configuration parameters for the ICs and/or chipset 232, 234 and 236 may be determined and may be returned to the communication device 220. In this manner, the configuration manager 238 may coordinate modification of the configuration parameters for the ICs and/or chipset 232, 234 and 236. Exemplary configuration parameters may adjust, for example, antenna and/or MIMO, SIMO, MISO, beamforming configuration, power level, interference rejection (for example, filter coefficients), equalizer length and/or dynamic range. In addition, which modulation to implement and/or which type of encoding and decoding to utilize may be configured. Also, analog to digital (A/D) precision may be modified. Adjustments in error detection and/or correction parameters may be made, for example, Viterbi decoder length may be modified. Moreover, MAC parameters such as timing thresholds, transmit window size and/or buffer space may be modified.

Figure 3:
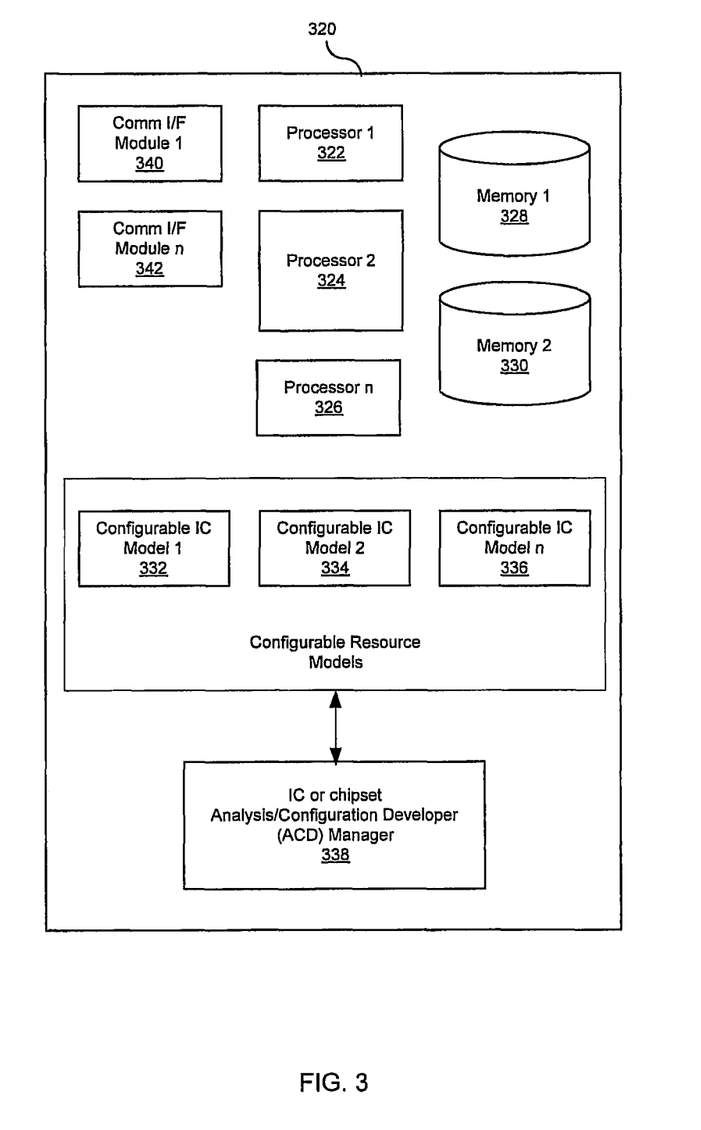
FIG. 3 is a block diagram of an exemplary device for that may be utilized to determine and/or communicate configuration parameters, in accordance with an embodiment of the invention.

FIG. 3 is a block diagram of an exemplary device for that may be utilized to determine and/or communicate configuration parameters, in accordance with an embodiment of the invention. Referring to FIG. 3, there is shown an analysis and/or configuration development device and/or system (ACD) 320 which may comprise one or more processors 322, 324 and 326, memory units 328 and 330, communication interface modules 340 and 342, models 332, 334 and 336 for configurable communication ICs and/or chipset and an analysis and/or configuration development device and/or system (ACD) manager 338.

The ACD 320 may comprise suitable logic, circuitry and/or code that is operable to determine various configuration parameters for configurable communication ICs and/or chipsets such as 232, 234 and/or 236, based on operating conditions and/or characteristics of transmissions. In this manner, the ACD 320 may provide support as a remote analysis and/or development system and/or service. For example, a user from a technical service and/or a vendor of the configurable communication ICs and/or chipsets 232, 234 and 236 may interact with the ACD 320. The ACD 320 may be communicatively coupled, by way of one or more networks, with one or more devices comprising the configurable communication ICs and/or chipset 232, 234 and 236. For example, the communication device 220 and/or the mobile phone 106, the laptop 108, the set-top-box 114 and/or the access point 116 may be communicatively coupled with the ACD 320.

The one or more processors 322, 324 and/or 326 may comprise, for example, a central processor, co-processor and/or digital signal processor (DSP) respectively. The processor 322 may comprise suitable logic, circuitry and/or code that enable control and/or management operations, in the ACD 320. In this regard, the processors 322 may communicate control and/or management operations to the communication interface modules 340 and 342, the models 332, 334 and 336 for configurable communication ICs and/or chipset and ACD manager 338, for example. The processors 324 and/or 326 may process data received or sent via the communication interfaces 340 and/or 342. In addition, the processor 342 and/or 326 may process data for the ACD manager 338 and/or the models 332, 334 and 336.

The one or more communication interface modules, for example, 340 and/or 342 may comprise suitable logic, circuitry and/or code that enable communication between the ACD 320 and deployed communication devices. For example, the communication device 220 and/or the mobile phone 106, the laptop 108, the set-top-box 114 and/or the access point 116 may be communicatively coupled with the ACD 320 via one or more communication interface modules such as 340 and/or 342. In this regard, the communication interface modules 340 and/or 342 may support universal serial bus (USB) and/or inter-IC sound ($I^2S$) for example. Moreover, the communication interface modules 340 and/or 342 may be operable to support one or more of a plurality of wireless, optical and/or wired technologies. For example, communication interface modules 340 and/or 342 may support one or more of PAN, for example, Bluetooth®, Zigbee, WLAN, Wi-Fi®, LAN, MAN, VoIP, FM radio, DVB-H, 2G, 3G and/or 4G cellular, infrared, multimedia and other wired, wireless and/or optical technologies.

The memory 328 and/or 330 may comprise suitable logic, circuitry, and/or code that enables storage and retrieval of data and/or instructions that may be utilized by the processors 322, 324 and/or 326 as well as the ACD manager 320 and/or models 332, 334 and/or 336. In this regard, the memory 328 and/or 330 may store at least a portion of data that may be transmitted and/or received by at least one of the communication interface modules 340 and/or 342. Moreover, the memory 328 and/or 330 may store at least a portion of data utilized and/or generated by the ACD manager and/or models 332, 334 and 336.

The ACD manager 338 may comprise suitable logic, circuitry and/or code that is operable to receive data from the device 220 and/or the mobile phone 106, the laptop 108, the set-top-box 114 and/or the access point 116. In this regard, the received data may be based on monitoring of the operating conditions and/or characteristics of the ICs and/or chipset 232, 234 and/or 236. Based on the received data, the ACD manager 338 may be utilized to determine new configuration parameters that may improve performance of the ICs and/or chipset. For example, the ACD manager 338 may determine configuration parameters based on simulations that utilize the received operating conditions and/or characteristics data. In addition the new configuration parameters may be based on channel models and/or models 332, 334 and/or 336, for the configurable communication ICs and/or chipset 232, 234 and/or 236. Exemplary new configuration parameters may adjust, for example, antenna and/or MIMO, SIMO, MISO, beamforming configuration, power level, interference rejection (for example, filter coefficients), equalizer length and/or dynamic range. In addition, which modulation to implement and/or which type of encoding and decoding to utilize may be configured. Also, analog to digital (A/D) precision may be modified. Adjustments in error detection and/or correction parameters may be made, for example, Viterbi decoder length may be modified. Moreover, MAC parameters such as timing thresholds transmit window size and/or buffer space may be modified. Although the ACD manager 338 may be utilized to determine new configuration parameters, in some embodiments of the invention, an engineer may be needed to determine a portion or all of the configuration parameters.

In operation, the ACD 320 may receive data from one or more devices "in the field" comprising configurable communication ICs and/or chipsets 232, 234 and/or 236, for example, from the communication device 220 described with respect to FIG. 2 and/or from the mobile phone 106, the laptop 108, the set-top-box 114 and/or the access point 116 described with respect to FIG. 1. The received data may comprise information derived from monitoring operating conditions and/or operating characteristics of the deployed ICs and/or chipset 232, 234 and/or 236. In this regard, the operating conditions and/or operating characteristics may be different for different instances of the deployed ICs and/or chipset 232, 234 and 236 according to each particular operating environment and/or type of utilization of the chips. The ACD 320 may determine new configuration parameters that may improve and/or optimize performance of the configurable communication ICs and/or chipset 232, 234 and/or 236 for operation within each particular operating environment and/or type of utilization. Furthermore, the new configuration parameters may be sent from the ACD 320 to the one or more devices "in the field" and the ICs and/or chipsets 232, 234 and/or 236 may be configured according to the new configuration parameters.

Figure 4:
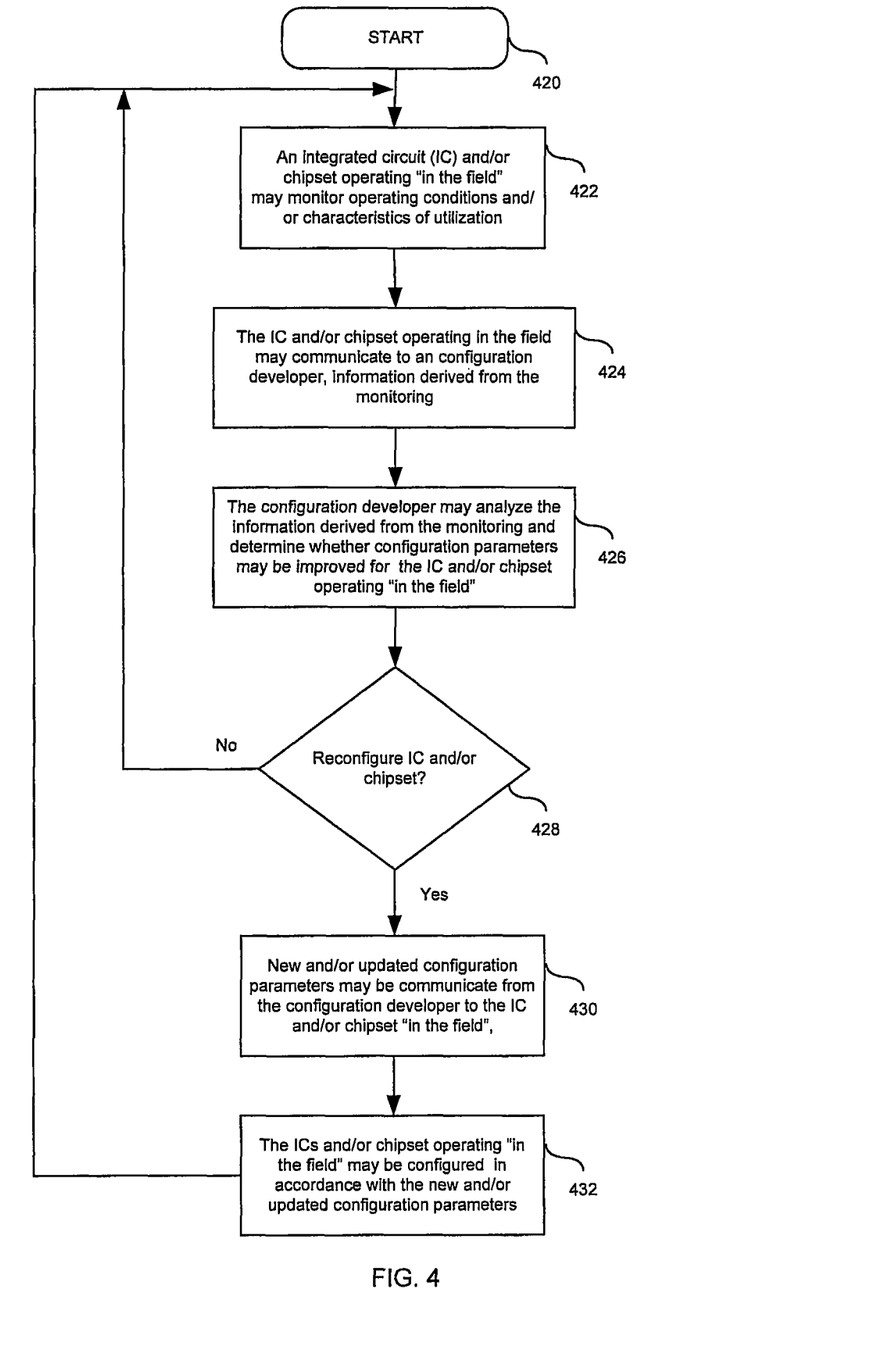
FIG. 4 is a flow chart illustrating exemplary steps for updating configuration parameters for configurable communication integrated circuits and/or chipsets, in accordance with an embodiment of the invention.

FIG. 4 is a flow chart illustrating exemplary steps for updating configuration parameters for configurable communication integrated circuits and/or chipsets, in accordance with an embodiment of the invention. Referring to FIG. 4, after start step 420, in step 422, an integrated circuit (IC) and/or chipset 232, 234 and/or 236b operating "in the field" may monitor operating conditions and/or characteristics of utilization. In step 424, the IC and/or chipset 232, 234 and/or 236 operating in the field may communicate to a configuration developer 320, information derived from the monitoring. In step 426, the configuration developer 320 may analyze the information derived from the monitoring and determine whether configuration parameters may be improved for the IC and/or chipset 232, 234 and/or 236 operating "in the field". In step 428, if the configuration developer 320 may determine that the ICs and/or chipset 232, 234 and/or 236 may be configured, proceed to step 430. In Step 430, new and/or updated configuration parameters may be communicated from the configuration developer 230 to the ICs and/or chipset 232, 234 and/or 236 "in the field". In step 432, the ICs and/or chipset 232, 234 and/or 236 operating "in the field" may be configured in accordance with the new and/or updated configuration parameters. Step 434 may be the end of the exemplary steps. In step 428, if the configuration developer 320 determines that the ICs and/or chipset 232, 234 and/or 236 does not need to be configured, the exemplary steps may proceed to step 422.

In an embodiment of the invention, a configurable communication integrated circuit (IC) and/or chipset 232, 234 and/or 236 which may be integrated within a wireless communication and/or multi-media communication device 220, may be deployed "in the field" and may be serviced by an external servicing entity. In this regard, the deployed configurable communication IC and/or chipset 232, 234 and/or 236 may be operable to handle one or more communication technologies comprising wireless communication, wired communication, and optical communication. Moreover, the deployed configurable communication IC and/or chipset 232, 234 and/or 236 may be may be operable to monitor its operating conditions, performance and/or utilization characteristics. In addition, the deployed configurable communication IC and/or chip set 232, 234 and/or 236 may transmit via a network, the information derived from the monitoring of operating conditions, performance and/or utilization characteristics to one or more external entities 122, 124 and/or 320, or users that may provide servicing. For example, the external entities 122, 124 and/or 320 may comprise a remote analysis and/or development system and/or an engineering service that may be enabled to utilize the information derived from the monitoring to determine configuration parameters for the deployed configurable communication IC and/or chipset 232, 234 and/or 236.

The external entities 122, 124 and/or 320 may send the configuration parameters to the configurable communication IC and/or chipset 232, 234 and/or 236. Upon receiving the configuration parameters from the external servicing entity, the deployed configurable communication IC and/or chip set 232, 234 and/or 236 may be configured or reconfigured. For example, the deployed configurable communication IC and/or chip set 232, 234 and/or 236 may configure and/or reconfigure itself, one or more times, according to the received configuration parameters. The transmitting and/or receiving of information by the deployed configurable communication IC and/or chipset 232, 234 and/or 236 as well as the determining and/or setting of configuration parameters may occur as background functions and/or operations with respect to other functionality and/or operations of the deployed configurable communication IC and/or chipset 232, 234 and/or 236. Moreover, the information derived from the monitoring and/or configuration parameters may be transmitted and/or received by the deployed configurable communication IC and/or chipset 232, 234 and/or 236 via a network for example a wired, wireless and/or optical network. In this manner, the deployed configurable communication integrated circuit and/or chipset 232, 234 and/or 236 may be configured and/or reconfigured one or more times.

In some embodiments of the invention, the process of a configuring and/or reconfiguring a deployed configurable communication IC and/or chipset 232, 234 and/or 236 may be performed by a vendor or an engineering service, for an extended period of time, for example, the lifetime of the IC and/or chipset 232, 234 and/or 236. The operating conditions that may be monitored by the configurable communication IC and/or chipset 232, 234 and/or 236 may comprise one or more of channel characteristics, interference characteristics and/or noise levels, signal to noise ratio and multi-path delay, received signal strength and long or short term operating statistics for example. Accordingly, the performance that may be monitored may comprise, for example, one or more of bit error rate (BER), packet error rate (PER), spectral efficiency and long or short term performance statistics. Moreover, the utilization characteristics that may be monitored may comprise one or more of current configuration parameters, transmit power levels, dynamic range, type and/or rate of data transmissions, quality of service (QoS) utilized and long or short term utilization statistics may be monitored. In this regard, the configuration parameters that may be determined based on the monitoring may adjust one or more of antenna and/or MIMO, SIMO, MISO and beamforming configuration, power level, interference rejection, equalizer length, dynamic range, modulation, encoding and/or decoding, analog to digital conversion precision, error detection and/or correction parameters within the deployed configurable communication IC and/or chipset 232, 234 and/or 236. Furthermore, MAC parameters such as timing thresholds, transmit window size and/or buffer space may be adjusted with the received and/or determined one or more configuration parameters.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for specifying a method and system for a configurable communication integrated circuit and/or chipset.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A configurable integrated circuit (IC) embedded in a mobile communications device, comprising:
    wireless communications platform circuitry configured to manage wireless communications of multimedia;
    an interface configured to receive media access control (MAC) configuration parameters from an external device, the received MAC configuration parameters based on a multi-path delay associated with the wireless communications platform circuitry, and the received MAC configuration parameters including a buffer space and a transmit window size;
    registers configured to:
    receive the received MAC configuration parameters from the interface;
    and define operating characteristics of the wireless communications platform circuitry according the received MAC configuration parameters;
    and monitoring circuitry configured to:
    monitor the configurable IC to identify the multi-path delay;
    and transmit data associated with the multi-path delay to the external device periodically, in a background wireless communication, to modify wireless communications supported by the wireless communications platform circuitry.

2. The configurable IC of claim 1, wherein the wireless communications platform circuitry includes circuitry configured to manage video telephony.

3. The configurable IC of claim 1, wherein the MAC parameters include timing thresholds.

4. The configurable IC of claim 1, wherein the received MAC configuration parameters are also based on bit error rate (BER) associated with the wireless communications platform circuitry.

5. The configurable IC of claim 1, wherein the received MAC configuration parameters are also based on packet error rate (PER) associated with the wireless communications platform circuitry.

6. The configurable IC of claim 1, wherein the received MAC configuration parameters are also based on at least one of bit error rate (BER), packet error rate (PER), and statistics from varying lengths of time.

7. A server for updating a configurable integrated circuit (IC) embedded in a mobile communications device, comprising:
    a memory unit configured to store configuration parameters for the configurable IC, the configuration parameters including media access control (MAC) parameters including a buffer space and a transmit window size, and the MAC parameters based on wireless communications performance characteristics associated with wireless communications platform circuitry within the configurable IC;
    and a communication interface configured to:
    receive information associated with the configurable IC from a background wireless communication of the configurable IC, periodically, to modify wireless communications of multimedia supported by the wireless communications platform circuitry, the information associated with the configurable IC including an indication of multi-path delay; and transmit the configuration parameters to the configurable IC according to the received information associated with the configurable IC.

8. The server of claim 7, further comprising simulation circuitry configured to simulate operation of the configurable IC with the configuration parameters.

9. The server of claim 7, wherein the MAC parameters include timing thresholds based on the multi-path delay.

10. The server of claim 7, wherein the wireless communications performance characteristics include bit error rate (BER).

11. The server of claim 7, wherein the wireless communications performance characteristics include packet error rate (PER).

12. The server of claim 7, wherein the wireless communications performance characteristics include statistics from varying lengths of time.

13. The server of claim 7, wherein the wireless communications performance characteristics include at least one of bit error rate (SER), packet error rate (PER), multi-path delay, and statistics from varying lengths of time, and wherein the configuration parameters include parameters configured to adjust analog to digital conversion precision.

14. A mobile communications device, comprising:
a configurable integrated circuit (IC) configured to manage a technology platform,
the configurable IC including:
registers configured to:
receive configuration parameters, the received configuration parameters based on at least wireless communications performance characteristics including a multi-path delay, the received configuration parameters including media access control (MAC) parameters including a buffer space and a transmit window size; and
define operating characteristics of the configurable IC according to the buffer space and the transmit window size; and
a monitoring circuit configured to:
monitor the operating characteristics associated with the configurable IC; and identify the wireless communications performance characteristics and operating conditions associated with the configurable IC;
a memory unit configured to store the received configuration parameters;
a communication interface configured to receive the received configuration parameters from a server; and
an IC configuration manager circuit configured to:
coordinate configuration of the configurable IC; and
communicate with the server periodically, in a background wireless communication, to modify wireless communications of multimedia supported by the technology platform.

15. The mobile communications device of claim 14, wherein the wireless communications performance characteristics include at least one of bit error rate (BER), packet error rate (PER), multi-path delay, and statistics from varying lengths of time, and wherein the received configuration parameters include parameters configured to adjust analog to digital conversion precision.

* * * * *